United States Patent [19]

Jakobs

[11] 4,327,862
[45] May 4, 1982

[54] WORM CENTRIFUGE

[75] Inventor: Willy Jakobs, Cologne, Fed. Rep. of Germany

[73] Assignee: Klöckner-Humboldt-Deutz AG, Fed. Rep. of Germany

[21] Appl. No.: 87,446

[22] Filed: Oct. 22, 1979

[30] Foreign Application Priority Data

Nov. 15, 1978 [DE] Fed. Rep. of Germany ....... 2849547

[51] Int. Cl.³ .......................... B04B 1/20; B04B 3/04
[52] U.S. Cl. ..................................... 233/7; 233/23 R
[58] Field of Search .................... 233/7, 23 R, 24, 25, 233/27

[56] References Cited

U.S. PATENT DOCUMENTS

| 3,734,399 | 5/1973 | Oas ......................................... 233/7 |
| 4,085,888 | 4/1978 | Jager ...................................... 233/7 |
| 4,141,488 | 2/1979 | Gense .................................... 233/7 |

FOREIGN PATENT DOCUMENTS 1178791 9/1964 Fed. Rep. of Germany.
2131087 1/1973 Fed. Rep. of Germany.

OTHER PUBLICATIONS

Monninghoff Publication, "Electromagnetic Tooth Clutches", Maschinenfabrik Monninghoff, Sep. 1978, pp. 1-8.
"Return Stop", Bolenz and Schafer, Catalog Dated 1976, pp. H-1 Through H-10.

*Primary Examiner*—Robert W. Jenkins
*Attorney, Agent, or Firm*—Hill, Van Santen, Steadman, Chiara & Simpson

[57] ABSTRACT

A worm centrifuge system is disclosed wherein a rotatably supported centrifuge drum is provided together with a conveyor worm rotatably supported within the drum. A drive motor is provided for the drum and a separate drive motor is provided for the worm. A centrifuge drum and conveyor worm are normally operated at different RPMs. The conveyor worm is driven by one of the motors through a planetary gear and a housing of the planetary gear is connected to the centrifuge drum. The other drive motor connects with the housing of the planetary gear by a belt system. A switchable coupling is provided to connect the input of the planetary gear to its housing during start-up and then selectively to disengage the housing from the input of the planetary gear after operating speed is attained and the other drive motor is energized. The maximum energy requirements for each of the drive motors is reduced, thereby reducing cost.

11 Claims, 1 Drawing Figure

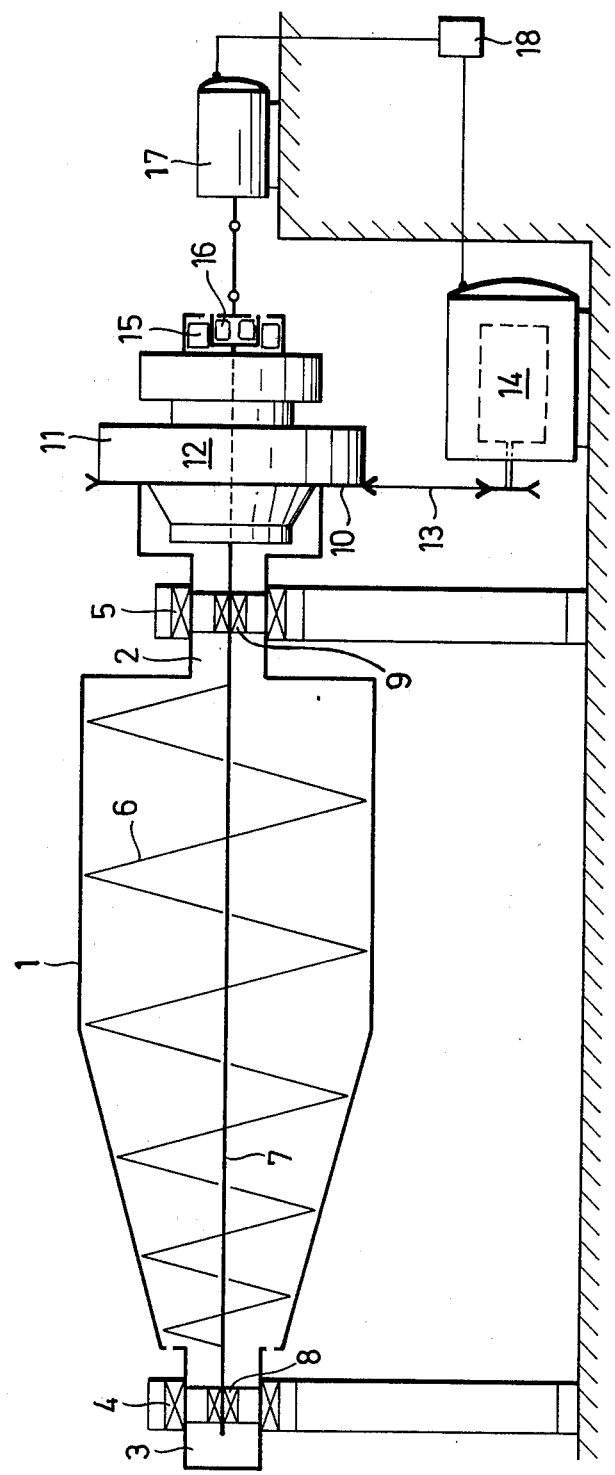

WORM CENTRIFUGE

BACKGROUND OF THE INVENTION

The invention relates to a worm centrifuge whose centrifuge drum and conveyor worm are driven by respective drive motors with different RPMs.

A worm centrifuge is known from German OS No. 2,131,087 incorporated herein by reference in which a synchronous motor is provided as a constant RPM motor for the drive of the centrifuge drum. The drive of the conveyor worm which deviates in RPM occurs by means of an asynchronous or RPM governor motor. For the purpose of retaining the RPM difference between the centrifuge drum and the conveyor worm (a relatively small difference of a few RPM to allow the material to move either to the left or the right through the drum depending whether the drum is at a relatively higher or lowre RPM) both electric motors are connected together at the current side in the fashion of an electric wave having an adjustable phase difference.

Also, a drive system for a worm centrifuge is known from the German AS No. 1,178,791 incorporated herein by reference in which the RPM difference required between the centrifugal drum and the discharge worm is generated by means of a motor gear which revolves together with the centrifugal drum. However, either because of their poor efficiency or because of the unnecessary reactive power, these known drive systems must be designed with greater strength than would be required for the centrifugal loss and conveying capacity of the worm required for the operation of the centrifuge. Unnecessarily high operating costs are the result.

SUMMARY OF THE INVENTION

An object of the invention consists in creating a drive system for a worm centrifuge whose drive motors for the centrifuge drum and the conveyor worm need only be designed for supplying power for centrifugal dissipation or, respectively, diffeential RPMs between the drum and worm with material therebetween causing friction loss. This object is achieved in that the drive of the conveyor worm and of the centrifuge drum occurs by means of external torques with the same direction caused by the drive motors. This is very advantageously accompanied by a cooperation or combination of torques which is mutual in its effect, whereby not only reactive powers in the motors are suppressed but, rather, the drive motors for the centrifuge drum and the conveyor worm need only be designed for the pure centrifugal dissipation or loss or, respectively, differential RPM output. In comparison to previously known drive systems for worm centrifuges, this produces a significant saving of energy and costs.

In a further development of the invention, the drive of the conveyor worm and of the centrifuge drum occurs via a planetary gear whose housing is connected to the centrifuge drum, and wherein a switching relay is provided which switches the drive motor of the centrifuge drum on. In this manner, the conveyor worm and the centrifuge drum can be very advantageously brought to operating RPM with the assistance of a drive assembly; namely, with the assistance of the friction contact between the conveyor worm and the centrifuge drum resulting according to the solids/liquids mixture therein. Therefore, the second drive motor can be additionally connected via the switching relay as needed both during the starting operation as well as upon attainment of the operating RPM of the centrifuge.

According to a further advantageous development of the invention, the drive motor of the conveyor worm engages the housing of the planetary gear via a switchable coupling. In this manner, the centrifuge drum and the conveyor worm can advantageously be brought in their unloaded state to the operating RPM with one motor having a relatively low output. Only after attainment of the operating RPM of the centrifuge is the drive motor of the centrifuge drum then switched on and the drive motor of the conveyor worm separated via the switchable coupling from the gear housing rotating together with the centrifuge drum. By so doing, the different RPM governed drive of the centrifuge drum and of the conveyor worm are taken care of on the one hand and, on the other hand, the drive motors for the centrifuge drum and the conveyor worm need be designed only for the pure centrifugal loss or, respectively, differential RPM output power loss.

In an advantageous further development of the invention, a planetary gear with a high transmission ratio i of preferably approximately 80 to 270 is provided as the planetary gear. In comparison to previously known drive systems, such a gear renders possible the employment of a relatively small drive motor with a low energy requirement during steady state operation (during start-up, the input and output of the planetary gear are locked together, as explained hereafter).

In a further development of the invention, a return stop is arranged between the drive motor of the conveyor worm and the gear housing. In this manner, given disruptions occurring at the drive motor or at the control system occurring during operation, the conveyor worm - which rotates with a different RPM with respect to the centrifuge drum during operation - is very advantageously driven by the gear housing rotating together with the centrifuge drum. By so doing, negative effects on the discharge of the solids from the centrifuge drum are avoided.

In a further development of the invention, both electric motors as well as hydraulic motors can be advantageously employed as drive motors for the conveyor worm and the centrifuge drum. Variable speed DC motors may be employed as electric motors for the drive of the conveyor worm and squirrel-cage motors may be employed for the drive of the centrifuge drum. Hydraulic motors with fully hydraulic or servohydraulic control are used for hydraulic drive. A squirrel-cage motor in conjunction with a mechanical variable speed drive can also replace the variable speed DC motor.

BRIEF DESCRIPTION OF THE DRAWING

The drawing schematically illustrates the worm centrifuge of the invention.

DESCRIPTION OF THE PREFERRED EMBODIMENTS

The worm centrifuge schematically illustrated in the drawing has a cylindrically-conically designed centrifuge drum 1 which is rotatably supported at both sides in bearings 4 and 5 via hollow axles 2 and 3. An appropriately designed conveyor worm 6 is arranged in this centrifuge drum 1. The worm shaft 7 (not shown in greater detail in the drawing) of said conveyor worm, which is likewise designed to be hollow, is rotatably arranged in bearings 8 and 9 at both sides within the hollow axle 2 and 3 of the centrifuge drum 1. A pulley 10 which is attached to the housing 11 of a planetary gear 12 is connected to the hollow shaft 2 of the centrifuge drum 1. The pulley 10 fastened to the housing 11 of the planetary gear 12 is in turn connected with an electric motor 14 (squirrelcage motor) via a V-belt 13.

An electrically switchable coupling 15 is provided on the right side of the gear 12, said coupling making possible a connection or a release of the drive shaft of the gear from the gear housing 11. The worm shaft 7 which runs into the gear housing 11 is connected to a DC motor 17 via the gear and a return stop 16 arranged at the right side of the gear. A switching relay 18 is arranged between this drive motor 17 of the conveyor worm and the drive motor 14 of the centrifuge drum 1, said switching relay making possible the additional switching of the drive motor 14 of the centrifuge drum 1 after attainment of the operating RPM of the centrifuge casing.

Upon being placed in operation in the unloaded state, i.e., empty, the worm centrifuge schematically illustrated in the drawing and directly connecting through the planetary gear and stop return to the motor is accelerated to the operating RPM respectively required with the assistance of the DC motor 17 after the connection of the drive or input shaft of the planetary gear with the planetary gear housing 11 by means of the electrically switchable coupling 15. After attainment of the operating RPM, the gear housing 11 rotating together with the centrifuge drum 1 is released from the gear input by means of the coupling 15 and the asynchronous motor 14 is switched on via the switching relay 18 and assumes the drive of the centrifuge drum 1 via the V-belt 13 and the pulley 10 arranged on the gear housing. The drive of the worm centrifuge is designed in such manner that the centrifuge drum 1 and the conveyor worm rotate with slightly different RPMs, namely, in such manner that the conveyor worm 6 driven by the DC motor 17 via the planetary gear rotates with a somewhat higher or, also, lower RPM than the centrifuge drum 1 driven by the asynchronous motor 14 via the gear housing 11. (The planetary wheels in the planetary gear freely rotate). As soon as the centrifuge drum 1 and the conveyor worm 6 have reached their operating RPMs, the centrifuge is loaded or, respectively, charged with the solids/liquids mixture to be separated via the worm hollow shaft 7 not illustrated in greater detail in the drawing. Now the asynchronous motor 14, which is only switched on upon attainment of the operating RPM of the centrifuge, must produce a portion of the centrifugal dissipation or loss, so that this motor need only be very advantageously designed for this centrifugal loss. Since, further, the centrifuge (centrifuge drum 1 and conveyor worm 6) can be accelerated in its unloaded state to the operating RPM respectively required by the DC motor 17 via the planetary gear 12 with a transmission ratio i of approximately 80 to 270 effective during steady state operation, it need only be designed for the starting operation and the output required for operation. This is only possible because no mechanical reactive power thereby occurs. Therefore, in comparison to the previously known drive systems for worm centrifuges, the two drive motors 14 and 17 can be designed or, respectively, dimensioned significantly smaller with respect to their output and structural design, so as to produce not only energy advantages but also cost-savings.

In order to avoid the conveyor worm 6 from conveying materials during operation in the direction opposite the desired material conveying direction, a return stop 16 is very advantageously provided at the planetary gear 12 by means of which a connection occurs between the drive of the conveyor worm and the gear housing 11 if disruptions or failure of the conveyor worm drive motor 17 occurs. Therefore, the conveyor worm 6 is entrained or driven by the drive of the centrifuge drum and is operated at the same speed.

Instead of the electric motors 14 and 17 illustrated in the drawing, hydraulic motors known per se with a fully hydraulic or servo-hydraulic control can, of course, be employed as the drive for the conveyor worm 6 and the centrifuge drum 1 with exactly the same advantages. Given fully hydraulic oil volume control, the increasing pressure of the oil volume is directly increased, whereas in servo-hydraulics the control of the oil volume occurs via a servo valve.

The subject matter of the invention, moreover, is not limited to the sample embodiment. Thus, the conveyor worm and centrifuge drum can also be driven and operated without gears and a special coupling with exactly the same advantages because of the rectified outer torques of the drive motors according to the invention.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A worm centrifuge, comprising: a rotatably supported centrifuge drum and a conveyor worm rotatably supported within the drum; a drive motor connected to drive the drum and a regulatable rotational speed drive motor connected to drive the worm; and means for driving the conveyor worm and the centrifuge drum at the same RPM by the regulatable motor during start-up and at different RPMs during operation and for insuring that external torques created by the drive motors are in the same direction.

2. A worm centrifuge according to claim 1 wherein the means for driving the conveyor worm and the centrifuge drum includes a planetary gear whose housing is connected with the centrifuge drum, and a switching drum on when normal operating speed is attained.

3. A worm centrifuge according to claim 2 wherein the means for driving further includes a switchable coupling means for connecting the drive motor of the conveyor worm to the housing of the planetary gear.

4. A worm centrifuge according to claim 3 wherein the planetary gear has a high transmission ratio of $i=80$ to 270.

5. A worm centrifuge according to claim 2 wherein a return stop means is arranged between the conveyor worm and the planetary gear housing for preventing the conveyor worm from conveying materials during operation in a direction opposite a desired material conveying direction by locking a rotational speed of the conveyor worm to that of the centrifuge drum connected to the planetary gear housing.

6. A worm centrifuge according to claim 2 wherein the switching means comprises a relay arranged between the drive motor of the conveyor worm and the drive motor of the centrifuge drum.

7. A worm centrifuge according to claim 1 wherein the drive motors comprise hydraulic motors with fully hydraulic or servo-hydraulic control.

8. A worm centrifuge according to claim 1 wherein the drive motors comprise electric motors.

9. A worm centrifuge, comprising: a rotatably supported centrifuge drum; a conveyor worm rotatably supported within the centrifuge drum; a drive motor for the centrifuge drum and a regulatable speed drive motor for the conveyor worm; a planetary gear having its housing connected to the centrifuge drum, its output connected to the conveyor worm, and its input connecting to the drive motor for the conveyor worm; switching means for selectively switching the drive motor for the centrifuge drum on after the centrifuge drum or conveyor worm have been brought to operating speed; and a switchable coupling means for selectively mechanically coupling the input drive shaft of the planetary gear to the planetary gear housing during start-up operation of the centrifuge drum and conveyor worm such that the drum and worm rotate at the same speed.

10. A method of operating a worm centrifuge having a rotatable centrifuge drum, a conveyor worm rotatably supported within the drum, a variable speed first motor driving the conveyor worm through a planetary gear, and a second motor driving a housing of the planetary gear, said housing being connected to the centrifuge drum unloaded connecting an input drive of the planetary gear to the planetary gear housing and turning on the first motor to slowly bring the centrifuge drum and conveyor worm up to approximate operating speed by gradually increasing speed; disconnecting the input of the planetary gear from the housing and turning on the second motor so as to bring the centrifuge drum to a first operating speed and the conveyor worm to a different operating speed; and loading the centrifuge drum.

11. The method of claim 10 wherein the first motor is switched on and off as needed to maintain operating RPM of the conveyor worm.

* * * * *